United States Patent Office 3,130,118
Patented Apr. 21, 1964

3,130,118
AQUEOUS KETENE DIMER EMULSION AND USE OF SAME FOR SIZING PAPER
Charles H. Chapman, San Mateo, Calif., assignor to Hercules Powder Company, Wilmington, Del., a corporation of Delaware
No Drawing. Filed Dec. 24, 1958, Ser. No. 782,670
6 Claims. (Cl. 162—175)

This invention relates to improved aqueous ketene dimer emulsions and to the use of same in the sizing of paper.

It is known that higher organic ketene dimers may be formed into aqueous emulsions with various emulsifying agents, as well as with various organic thickening agents such as starch and water-soluble cellulose ethers, and that these ketene dimer emulsions are useful in the surface sizing of paper. Such emulsions, however, have not proven equally advantageous for the internal sizing of paper, as by addition to the beater.

A principal object of the invention is the provision of new and improved aqueous ketene dimer emulsions which may be used advantageously for the internal sizing of paper.

A further object of the invention is the provision of new and improved aqueous ketene dimer emulsions which are substantially more effective for the internal sizing of paper than previously known emulsions of this type.

A still further object of the invention is the provision of new and improved aqueous ketene dimer emulsions which are retained by cellulose fibers more uniformly and in much larger amounts than previously known emulsions of this type.

Another object of the invention is the provision of improvements in the sizing of paper with aqueous ketene dimer emulsions.

Still another object of the invention is the provision of aqueous ketene dimer emulsions of improved quality in that they show less tendency for particle separation with or without dilution with water.

In accordance with the invention, these and other objects are accomplished by the provision of aqueous ketene dimer emulsions having, as the dispersed phase, a higher organic ketene dimer or mixture of higher organic ketene dimers and, as the continuous phase, an aqueous solution of a cationic modified starch. Cationic modified starches which are particularly satisfactory for use herein are amine modified starches having the formula:

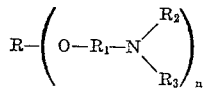

wherein R is molecule starch, $R_1$ is selected from the group consisting of alkylene, hydroxyalkylene, phenyl alkylene and alkylalkylene, $R_2$ and $R_3$ are each selected from the group consisting of alkyl, aryl, aralkyl, cycloalkyl and hydrogen, and $n$ is the degree of substitution of the starch molecule.

Cationic modified starches represented by the above formula may be prepared by etherifying ungelatinized starch as well as starch derivatives including dextrinized starch, hydrolyzed starch, oxidized starch and the like, with an etherifying agent selected from the group consisting of dialkylaminoalkyl epoxides, dialkylaminoalkyl halides, and the corresponding compounds containing aryl groups in addition to the alkyl groups.

Representative examples of suitable etherifying agents which may be used herein include β-dimethylaminoethyl chloride; β-diethylaminoethyl chloride; β-dimethylaminoisopropyl chloride; 3-dibutylamino-1,2-epoxypropane; 2-bromo-5-diethylaminopentane hydrobromide; N-(2,3-epoxypropyl) piperidine; and N,N-(2,3-epoxypropyl) methyl aniline. The various halides (e.g., chloro-, bromo- and so on) can be used interchangeably. Instead of the free amines (e.g., β-diethylaminoethyl chloride), the hydrochloride or other salts of these reagents may also be used. It will also be evident that besides the alkyl, aryl and aralkyl types, etherifying agents containing cyclic groups may also be used.

The reaction between the starch and the etherifying agent is carried out in an alkaline medium. This is preferably accomplished by suspending the starch in water containing, or to which is subsequently added, (1) sufficient base, such as an alkali metal hydroxide, quaternary ammonium hydroxide or the like, to maintain the mixture in an alkaline state during the reaction and (2) a suitable known gelatinization retarding chemical, such as sodium sulfate, to avoid gelatinization of the starch. The required amount of etherifying agent is then added with constant agitation and the mixture heated at reflux until the etherification reaction is completed. The treated starch may then be separated from the mixture in any suitable manner as by filtration.

The proportion of etherification reagent to be used will vary with the particular reagent chosen and the degree of substitution desired. For purposes of the present invention the degree of substitution (D.S.) of the starch molecule repeating unit may be from about 0.005 to about 3. The preferred D.S. range is from about 0.01 to 0.1. The etherifying reagent will be used in an amount such that the desired D.S. will be obtained under the conditions of reaction.

The ketene dimers which are used in the instant process are dimers having the formula:

$$[RCH=C=O]_2$$

where R is a hydrocarbon radical, such as alkyl having at least 8 carbon atoms, cycloalkyl having at least 6 carbon atoms, aryl, aralkyl and alkaryl. In naming ketene dimers, the radical "R" is named followed by "ketene dimer." Thus, phenyl ketene dimer is:

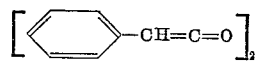

benzyl ketene dimer is:

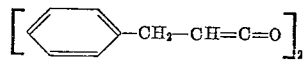

and decyl ketene dimer is: $[C_{10}H_{21}-CH=C=O]_2$. Representative ketene dimers whose emulsions may be used in the process of the instant invention include octyl, decyl, dodecyl, tetradecyl, hexadecyl, octadecyl, eicosyl, docosyl, tetracosyl, phenyl, benzyl β-naphthyl and cyclohexyl ketene dimers, as well as the ketene dimers prepared from montanic acid, naphthenic acid, $\Delta^{9,10}$-decylenic acid, $\Delta^{9,10}$-dodecylenic acid, palmitoleic acid, oleic acid, ricinoleic acid, petroselinic acid, vaccenic acid, linoleic acid, linolenic acid, eleostearic acid, licanic acid, parinaric acid, tariric acid, gadoleic acid, arachidonic acid, cetoleic acid, erucic acid and salacholeic acid, as well as ketene dimers prepared from naturally occurring mixtures of fatty acids, such as those mixtures found in coconut oil, babassu oil, palm kernel oil, palm oil, olive oil, peanut oil, rape oil, beef tallow, lard (leaf) and whale blubber. Mixtures of any of the above named fatty acids with each other may also be used.

In preparing the aqueous ketene dimer emulsions of the invention, the ingredients, namely, starch, water and ketene dimer, are mixed and the mixture then subjected to vigorous shear action such as that of a Waring Blendor, a colloid mill or a homogenizer. To facilitate mixing, the starch is desirably cooked in water at about 90–95° C.

for about 15 minutes, following which it is preferably cooled to about 60–65° C. or lower prior to addition of the ketene dimer. It is desirable to make these emulsions at the lowest possible temperature to avoid hydrolysis of the ketene dimer. The temperature, however, should be above the melting point of the ketene dimer and above the temperature at which the mixture is not conveniently workable because of high viscosity of the cationic starch. In general, therefore, temperatures utilized will usually vary from about 25° C. to about 95° C., preferably at least 50° C. but also about 5° C. above the melting point of the ketene dimer.

The upper limit of cationic starch concentration is that determined by the viscosity of the starch solutions which limit handling. This can be determined readily by one skilled in the art. However, as a guide, the upper limit, for most cationic starches, is about 6% for usual commercial equipment.

As regards the lower limit of cationic starch concentration, quite satisfactory emulsions may be prepared with 0.5% starch. While it is possible to utilize smaller amounts, i.e., as little as 0.1% starch, this will seldom be done in commercial practice because of the large volume of water needed for operation.

The concentration of ketene dimer utilized in the preparation of these emulsions may vary from as little as about 0.01% up to about 40%. The most practical range, however, is from about 1% to about 15% and this is the preferred range. The concentrations of starch and ketene dimer, hereinabove given, are percentages by weight, based on the weight of the emulsion.

The ratio of ketene dimer to cationic starch utilized in the preparation of these emulsions may vary from about 20:1 to about 1:100 or even lower, if desired. The preferred range is from about 3:1 to about 1:10.

The use of some form of high shear apparatus appears to be important in order to prepare commercially satisfactory emulsions in accordance with the process of the present invention. Any suitable apparatus of this type such as a Waring Blendor, a colloid mill, a homogenizer or the like may be used.

While the aqueous ketene dimer emulsions of the invention may be used in the surface sizing of paper they are particularly advantageous when utilized as internal additives. Since the bulk of commercial paper is sized by internal addition, the importance of this will be obvious. When utilized for internal sizing, these aqueous emulsions are added to the aqueous pulp suspension at any point after refining is complete and prior to sheet formation. It is preferred to add them as close to the point of sheet formation as possible. On a paper machine this would be at a point between and including the intake side of the fan pump and the head box.

The emulsions may be added to the pulp suspension at any convenient concentration. This concentration will be dictated by rate of paper production, method of metering and concentration of emulsion preparation. The preferred ratio of ketene dimer to cationic starch for purposes of such addition will depend somewhat upon the nature of the pulp and the nature and amount of impurities in the water used for sheet making. For most cases the preferred ratios are in the range of about 2:1 to 1:5. If less than this amount of cationic starch is used in emulsion preparation, more cationic starch solution may be added before addition of the emulsion to the pulp.

Following addition of the aqueous ketene dimer emulsion the aqueous pulp suspension may be sheeted and dried in the usual manner. If desired, the sheet may be cured by heating to a relatively elevated temperature, say about 100° C., for a short period of time, such as about 10 minutes. However, this is not necessary as adequate sizing develops on mere standing at room temperature for a few hours. Furthermore, with most grades of pulp, sheets prepared at pH 6.5 to 9.5 will be sized as they come off the machine so that additional curing is not needed.

The amount of ketene dimer emulsion added to the aqueous pulp suspension should be such that the cellulose fibers absorb thereon from about 0.01% to about 1%, and preferably from about 0.01 to .5%, by weight of ketene dimer, based on the dry weight of fiber. Assuming that approximately 50% of the ketene dimer in the emulsion is retained by the fibers, this will mean that the emulsion should be added to the aqueous pulp suspension in amounts such as to provide therein from about 0.02% to about 2% by weight of ketene dimer based on the dry weight of fiber.

The following examples will illustrate the invention. In these examples, all sheet making was done with a modified Buchner funnel as a sheet mold to give 6⅛ inch diameter hand-sheets which had a basis weight of 40 lbs./3000 sq. ft. The pulp used was Tacoma bleached kraft beaten to 750 cc. Schopper Reigler freeness in pH 7.5 to 8.0 tap water. Proportioner consistency was adjusted to 0.5% while the deckle consistency was at 0.12%. Dilution for the first sheet was with fresh water. For succeeding sheets, the white water from the preceding sheet was used with the excess discarded. About 75% of the white water was recycled under these conditions. The sheets were pressed between felts and then drum dried 60 sec. at 240° F. After the sheets were at least one week old, photometer sizing was determined on sheets 2–6 in each set with standard feather ink. The end point was taken at 85% reflectance. The values reported for sizing are the averages for the values from the five sheets.

EXAMPLE 1

One gram (1 g.) of each of several starches was cooked in about 150 ml. water at 90–95° C. for 15 minutes. The cooked starch, in each case, was diluted to 200 g., cooled to 60–65° C. and 0.5 g. of a mixed tetradecyl-, hexadecyl-ketene dimer prepared from a mixture of palmitic and stearic acids added. The mixture was beaten for 3 minutes in a Waring Blendor and then poured into a bottle to cool. The starches included in this experiment were Huron J wheat starch (alkali-treated) and this same wheat starch converted to dimethylaminoethyl starch (D.S. 0.14 and 0.27) and to diethylaminoethyl starch (D.S. 0.015 and 0.036). Emulsion quality was judged by visual examination of the amount of ketene dimer which floated to the top of the emulsion on cooling and standing. A thick layer on top, coupled with low opacity of the water below, indicated a poor emulsion. Based on these criteria, the unmodified wheat starch emulsion was very poor compared with the four modified starches. In all cases, the particles separated to the top could be redispersed by shaking the emulsion and separation occurred slowly, requiring 16 to 24 hours for completion.

EXAMPLE 2

In this experiment, the emulsions were prepared as follows: 60 g. of starch was cooked in 1800 ml. water at 90–95° C. for 15 minutes. After the starch solution was cooled to 60–65° C., 30 g. of a mixed tetradecyl-, hexadecyl ketene dimer and 9.1 ml. of 22% aqueous Dowicide G (primarily sodium pentachlorophenate plus sodium salts of other chlorophenols) were mixed with the starch. Water at 65° C. was added to 2000 g. This mixture was homogenized with a Model 25M3BA Manton-Gaulin homogenizer at 2500–2800 p.s.i. The resulting emulsion was cooled to room temperature over a period of 30 minutes and then used to size paper as described above. The emulsion addition was adjusted to add 0.075% ketene dimer based on the dry weight of fiber. The following table summarizes the results of sizing:

Table

| Starch: | Photometer sizing, secs. |
|---|---|
| Huron J Wheat starch | 0 |
| Diethylaminoethyl J wheat starch (D.S. 0.01) | 185 |
| Diethylaminoethyl J wheat starch (D.S. 0.02) | 205 |
| Diethylaminoethyl J wheat starch (D.S. 0.04) | 234 |
| Diethylaminoethyl J wheat starch (D.S. 0.1) | 332 |
| Commercial starch No. 1 [1] (D.S. 0.03) | 266 |
| Commercial starch No. 2 [1] (D.S. 0.05) | 326 |
| Commercial starch No. 3 [1] (D.S. 0.1) | 229 |
| Commercial starch No. 4 [1,2] (D.S. 0.49) | 311 |

[1] Commercial cationic starches having the general formula

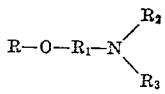

in which R is starch, $R_1$ is ethyl and $R_2$ and $R_3$ are each selected from methyl or ethyl groups.

[2] Starch cold water soluble. Solution heated to 65° C. before addition of ketene dimer.

EXAMPLE 3

An aqueous ketene dimer emulsion was prepared and evaluated in paper following the procedure of Example 2. The ketene dimer utilized was an alkyl ketene dimer derived from stearic acid. The cationic starch utilized was the commercial starch No. 1 utilized in Example 2. The photometer sizing, with 0.075% ketene dimer added, was 285 sec.

EXAMPLE 4

A blend of a 2% solution of commercial starch No. 1 of Example 2 (cooked 15 minutes at 90–95° C.) and 2% of a mixed hexadecyl-, tetradecyl-ketene dimer from a mixture of stearic and palmitic acids were milled in a 3-inch Premier colloid mill at 17,000 r.p.m. with 2.5 mils clearance between rotor and stator. This emulsion was used to make paper with the addition of 0.1% of the ketene dimer. Photometer sizing was 475 secs.

Aqueous ketene dimer emulsions prepared with cationic modified starches have many advantages over similar emulsions prepared with other well known emulsifiers and/or thickening agents including unmodified starches. Thus they have better quality and stability. Moreover, when used as an internal additive for the sizing of paper, the fibers retain larger amounts of the ketene dimer and, in addition, are more uniformly impregnated. And finally, the sizing obtained is substantially greater.

What I claim and desire to protect by Letters Patent is:

1. As a composition of matter an aqueous emulsion having, as the continuous phase, an aqueous solution of an emulsifier consisting essentially of from about 0.1% to about 6% by weight, based on the weight of the emulsion, of a cationic starch having the formula:

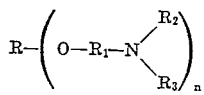

where R is starch, $R_1$ is selected from the group consisting of alkylene, hydroxyalkylene, phenyl alkylene and alkylalkylene groups, $R_2$ and $R_3$ are each selected from the group consisting of hydrogen, alkyl, aryl, aralkyl and cycloalkyl groups, and $n$ is from 0.005 to 3 and, as the dispersed phase, a ketene dimer having the formula:

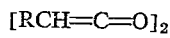

$$[RCH=C=O]_2$$

where R is a hydrocarbon radical selected from the group consisting of alkyl having at least 8 carbon atoms, cycloalkyl having at least 6 carbon atoms, aryl, aralkyl and alkaryl.

2. An aqueous emulsion as set forth in claim 1 wherein the concentration of ketene dimer is from about 1% to about 15% by weight, based on the weight of the emulsion, and the concentration of starch is from about 0.5% to about 6% by weight, based on the weight of the emulsion.

3. An aqueous emulsion as set forth in claim 2 wherein the ratio of ketene dimer to cationic starch is from about 20:1 to about 1:100.

4. The method of preparing an aqueous ketene dimer emulsion which comprises forming an aqueous mixture of an emulsifier consisting essentially of from about 0.1% to about 6% by weight, based on the weight of the emulsion, of a cationic starch having the formula:

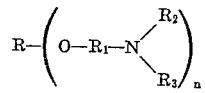

where R is starch, $R_1$ is selected from the group consisting of alkylene, hydroxyalkylene, phenyl alkylene and alkylalkylene groups, $R_2$ and $R_3$ are each selected from the group consisting of hydrogen, alkyl, aryl, aralkyl and cycloalkyl groups, and $n$ is from 0.005 to 3 and a ketene dimer having the formula:

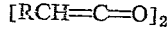

$$[RCH=C=O]_2$$

where R is a hydrocarbon radical selected from the group consisting of alkyl having at least 8 carbon atoms, cycloalkyl having at least 6 carbon atoms, aryl, aralkyl and alkaryl and subjecting the mixture to high shear action.

5. A process of sizing paper which comprises treating the same with an aqueous emulsion having, as the continuous phase, an aqueous solution of an emulsifier consisting essentially of from about 0.1% to 6% by weight, based on the weight of the emulsion, of a cationic starch having the formula:

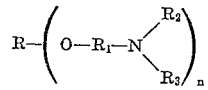

where R is starch, $R_1$ is selected from the group consisting of alkylene, hydroxyalkylene, phenyl alkylene and alkylalkylene, $R_2$ and $R_3$ are each selected from the group consisting of hydrogen, alkyl, aryl, aralkyl and cycloalkyl, and $n$ is from 0.005 to 3 and, as the dispersed phase, a ketene dimer having the formula:

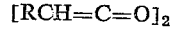

$$[RCH=C=O]_2$$

where R is a hydrocarbon radical selected from the group consisting of alkyl having at least 8 carbon atoms, cycloalkyl having at least 6 carbon atoms, aryl, aralkyl and alkaryl, and then drying the paper.

6. A process for the internal sizing of paper which comprises adding to an aqueous suspension of cellulosic paper stock at a point ahead of sheet formation an aqueous emulsion having, as the continuous phase, an aqueous solution of an emulsifier consisting essentially of from about 0.1% to about 6% by weight, based on the weight of the emulsion, of a cationic starch having the formula:

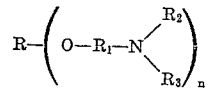

where R is starch, $R_1$ is selected from the group consisting of alkylene, hydroxyalkylene, phenyl alkylene and alkylalkylene, $R_2$ and $R_3$ are each selected from the group consisting of hydrogen, alkyl, aryl, aralkyl and cycloalkyl, and $n$ is from 0.005 to 3 and, as the dispersed phase, a ketene dimer having the formula:

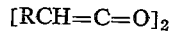

$$[RCH=C=O]_2$$

where R is a hydrocarbon radical selected from the group consisting of alkyl having at least 8 carbon atoms, cycloalkyl having at least 6 carbon atoms, aryl, aralkyl and alkaryl, said emulsion being added to the aqueous suspension of cellulosic paper stock in an amount to provide from about 0.02% to about 2% by weight, based on the dry weight of paper stock, of ketene dimer, forming a sheet from the said stock and drying the sheet.

References Cited in the file of this patent

UNITED STATES PATENTS

| | | |
|---|---|---|
| 2,627,477 | Downey | Feb. 3, 1953 |
| 2,762,270 | Keim et al. | Sept. 11, 1956 |
| 2,785,067 | Osberg | Mar. 12, 1957 |
| 2,813,093 | Caldwell et al. | Nov. 12, 1957 |
| 2,876,217 | Paschall | Mar. 3, 1959 |
| 2,917,506 | Caldwell et al. | Dec. 15, 1959 |
| 2,935,436 | Caldwell et al. | May 3, 1960 |
| 3,006,806 | Schur | Oct. 31, 1961 |
| 3,070,452 | Harris et al. | Dec. 25, 1962 |